United States Patent
Frahm

(10) Patent No.: US 11,298,895 B2
(45) Date of Patent: Apr. 12, 2022

(54) INFUSION DEVICE AND METHOD FOR PRODUCING FIBER-REINFORCED COMPOSITE PARTS

(71) Applicant: Covestro Intellectual Property GmbH & Co. KG, Leverkusen (DE)

(72) Inventor: Andreas Frahm, Cologne (DE)

(73) Assignee: Covestro Intellectual Property GmbH & Co. KG, Leverkusen (DE)

(*) Notice: Subject to any disclaimer, the term of this patent is extended or adjusted under 35 U.S.C. 154(b) by 0 days.

(21) Appl. No.: 17/277,408

(22) PCT Filed: Sep. 26, 2019

(86) PCT No.: PCT/EP2019/076100
§ 371 (c)(1),
(2) Date: Mar. 18, 2021

(87) PCT Pub. No.: WO2020/069982
PCT Pub. Date: Apr. 9, 2020

(65) Prior Publication Data
US 2021/0308964 A1 Oct. 7, 2021

(30) Foreign Application Priority Data
Oct. 2, 2018 (EP) .................... 18198208

(51) Int. Cl.
*B29C 70/48* (2006.01)
*B29C 37/00* (2006.01)
*B29C 70/54* (2006.01)
*B29K 75/00* (2006.01)
*B29L 31/08* (2006.01)

(52) U.S. Cl.
CPC .......... *B29C 70/48* (2013.01); *B29C 37/0092* (2013.01); *B29C 70/546* (2013.01); *B29C 2791/006* (2013.01); *B29K 2075/00* (2013.01); *B29L 2031/085* (2013.01)

(58) Field of Classification Search
CPC ...................................... B29C 70/48
See application file for complete search history.

(56) References Cited

U.S. PATENT DOCUMENTS

| | | | | |
|---|---|---|---|---|
| 7,147,818 | B1* | 12/2006 | Rigas | B29C 70/443 264/510 |
| 7,334,782 | B2* | 2/2008 | Woods | B29C 70/443 264/510 |
| 7,473,385 | B2 | 1/2009 | Stiesdal et al. | |
| 2007/0182071 | A1* | 8/2007 | Sekido | B29C 70/48 264/511 |

(Continued)

FOREIGN PATENT DOCUMENTS

WO 2012123280 A1 9/2012

OTHER PUBLICATIONS

International Search Report, PCT/EP2019/076100, dated Dec. 20, 2019, Authorized officer: D. Bibollet-Ruche.

*Primary Examiner* — Galen H Hauth
(74) *Attorney, Agent, or Firm* — Jed C. Benson

(57) ABSTRACT

The invention relates to a method for producing fiber-reinforced composite parts by means of vacuum infusion of a reactive resin mixture, characterized in that the steps of production of the reactive resin mixture and injection into the cavity are carried out in an infusion device in immediate temporal succession.

10 Claims, 2 Drawing Sheets

(56) References Cited

U.S. PATENT DOCUMENTS

2011/0146896 A1\* 6/2011 Schibsbye ............... B29C 70/48
  156/245
2011/0193777 A1   8/2011 Zhou et al.
2014/0213729 A1\* 7/2014 Hongo .................. C08F 279/02
  525/122

\* cited by examiner

INFUSION DEVICE AND METHOD FOR PRODUCING FIBER-REINFORCED COMPOSITE PARTS

CROSS-REFERENCE TO RELATED APPLICATION

This application is a national stage application under 35 U.S.C. § 371 of PCT/EP2019/076100, filed Sep. 26, 2019, which claims the benefit of European Application No. 18198208.3, filed Oct. 2, 2018, each of which is incorporated herein by reference.

FIELD

The present invention relates to a process for the production of fiber-reinforced composite components by means of vacuum-assisted infusion of a reactive resin mixture, characterized in that production of the reactive resin mixture and injection into the cavity take place in an integrated infusion device and follow one another without any chronological interruption.

BACKGROUND

Fiber-reinforced composite components (fiber-composite components) composed of a thermoset plastic (resin) as matrix material and of reinforcing fibers are frequently used as construction material because they have high mechanical strength together with low weight. These fiber-composite components are produced by way of example by way of the infusion of a liquid, reactive mixture of resin components into a laid fiber scrim, followed by hardening (crosslinking) of the resin. These fiber-composite components have a wide range of possible uses and can be used by way of example in aircraft construction, in automobile construction or in rotor blades of wind turbines. Resins used are usually unsaturated polyester polymers, vinyl ester polymers and/or epoxy polymers; recent years have also seen increased use of polymers comprising polyurethane structures, and also of hybrids of the abovementioned polymers (e.g. polyacrylate-polyurethane polymers).

In the case of large fiber-composite components specifically, production is generally achieved by way of vacuum-assisted infusion processes, as described by way of example in EP 1 310 351 A1 and in WO 2012/123280 A1. These processes can achieve rapid and uniform distribution of the resin. Another important factor here is that saturation of the fibers by the resin material is maximized and that hardening of said material is not excessively rapid. Non-uniform infusion can otherwise lead to gas inclusions or to incomplete wetting of the laid fiber scrim, and also consequently to cracking, which can reduce the stability of the component or even lead to delamination of the layers. Defects of this type on the surface of a component provide a possible point of weakness; this can contribute to premature wear.

WO 2012/123280 A proposes, for the avoidance of gas inclusions, a vacuum infusion process in combination with maximized degassing of the feeds for the resin mixture (termed "resin component" and "hardener component"). For this purpose, a vacuum is applied to the storage vessels for the degassing of the reactive components in the device proposed by WO 2012/123280 A and, for the vacuum infusion, a reduced pressure is applied to the casting mold by way of evacuation equipment (see FIG. 1).

However, the device disclosed in WO 2012/123280 A still has shortcomings for the processing of extremely water-sensitive resins such as polyurethanes. The evacuation line used to transfer the vacuum applied to the casting mold during the vacuum infusion always requires an upstream membrane or other flow barrier for the resin, in order to avoid transfer of the resin into the line and/or into the pump.

This evacuation equipment does not permit satisfactory drying and evacuation of the fibers placed into the mold, and of the valves, devices, lines downstream of the feeds, and of the mold. Nor are these problems solved by the vacuum-assisted infusion process disclosed in EP 2 886 322 A1 for the production of fiber-reinforced composite components, which describes the drying of introduced fibers and subsequent saturation thereof with resin. The resulting problems—defects and cracking—are similar to those that can be observed to result from inadequate degassing of the components; the reaction between water and reactive component additionally influences the quality of the resin per se.

SUMMARY

The invention described in this document has the aim of solving the prior-art problems relating to defective quality of large fiber-composite components produced from water-sensitive reactive resin components.

For this purpose, the invention proposes the following modification of the process disclosed in the prior art described above:

The invention provides a vacuum-assisted infusion process for the production of fiber-reinforced composite components, where a reactive resin mixture is injected into a cavity comprising a laid fiber scrim, comprising the steps of:
  a. provision of a reaction-injection device (40) comprising at least two feeds (48, 49) comprising the reactive resin components, evacuation equipment (50) for the degassing of the feeds (48, 49), a metering unit (44a, 44b) attached respectively to the feeds (48, 49) by way of supply lines (41, 42), and a mixing unit (43) in which the reactive resin components from the metering units (44a, 44b) are brought together, and
  b. provision of a closed cavity (10) comprising a laid fiber scrim (21), which
    i. is encompassed by a shell that has at least one input duct (31) suitable for the application of vacuum to the cavity (10) and for the input of resin into the cavity (10), and
    ii. has at least one drying duct (32) suitable for the introduction of a drying gas into the cavity in order to remove moisture from the laid fiber scrim (21) and for the application of vacuum by means of a first vacuum source (34) for the evacuation during the infusion and optionally during the drying, and
    iii. has connection to the reaction-injection device (40) at the input duct (31) by way of an input line (45), where this input line (45) can be evacuated by way of a lateral outlet (46) which can be closed and which is attached on a second vacuum source (47),
  c. degassing and drying of the cavity (10) and of the laid fiber scrim (21) present therein, of the input line (45) and optionally of the mixing unit (43) with the aid of the second vacuum source (47), where optionally a drying gas (33) is introduced by way of the drying duct (32) or optionally an additional evacuation takes place with the aid of the first vacuum source (34),
  d. start of the infusion procedure via input of the degassed, reactive components from the feeds (48, 49) into the metering units (44a, 44b) of the reaction-injection device (40) by way of the supply lines (41, 42), and production of a reactive resin mixture from the components in the mixing unit (43), where the outlet (46) to the second vacuum source (47) is closed before said outlet is reached by the reactive resin mixture, and e. injection of the reactive resin mixture by way of the input duct (31) into the cavity (10) optionally with simultaneous evacuation of the cavity (10) with the aid of the first vacuum source (34) by way of the drying duct (32), where, during the injection, the entry pressure measured at the entry point of the cavity remains lower than the ambient pressure, and f. completion of reaction of the resin mixture with hardening in the cavity (10).

BRIEF DESCRIPTION OF THE DRAWINGS

Various features and characteristics of the invention described in this specification may be better understood by reference to the accompanying figures, in which.

DETAILED DESCRIPTION

Figure 1:
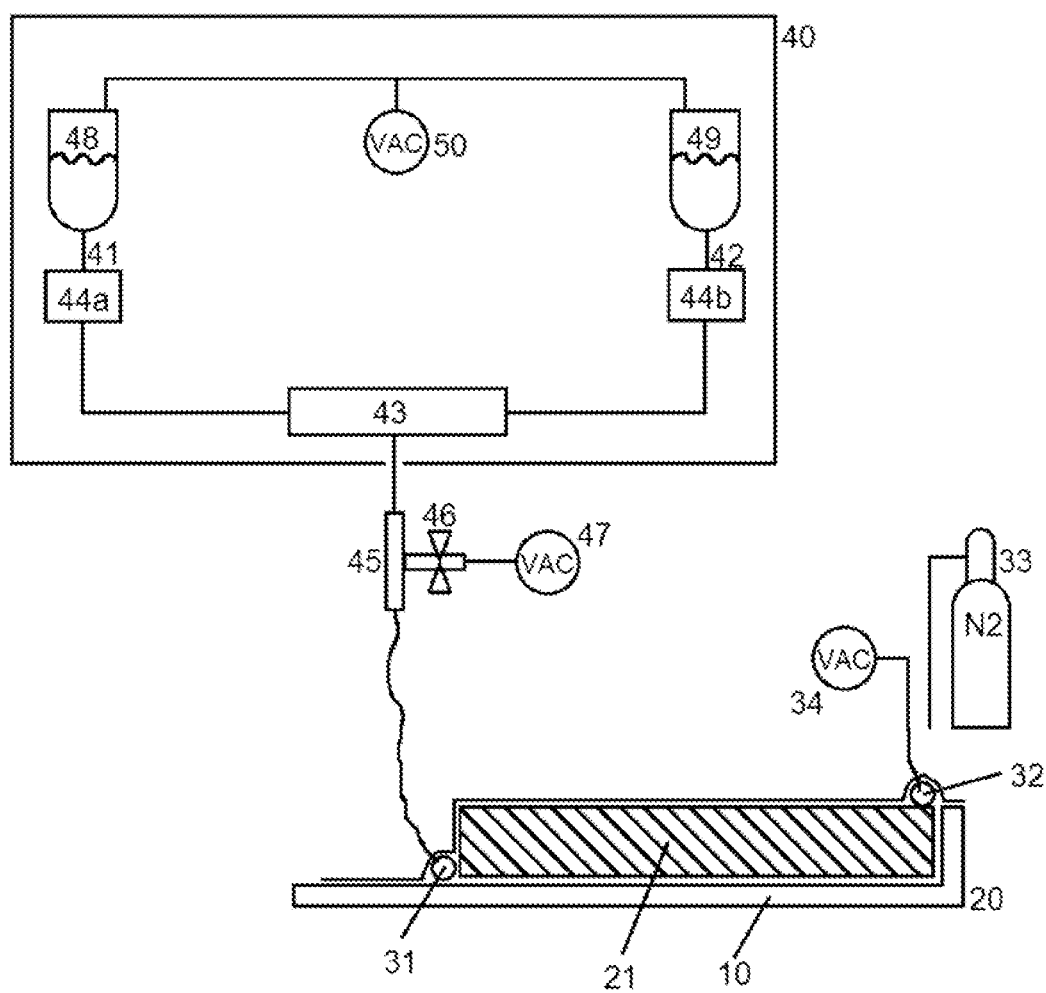
FIG. 1 depicts an infusion device.

The vacuum-assisted infusion process according to the invention for the production of fiber-reinforced composite components (20) is preferably a vacuum-assisted resin transfer molding process.

In an embodiment, the fiber-reinforced composite component (20) is a wind turbine rotor blade and the resin comprises polyurethane resins, unsaturated polyester resins, vinyl ester resins, hybrid resins, and/or epoxy resins.

In a preferred embodiment, the resin is a polyurethane-based resin, in particular a polyurethane-polyacrylic hybrid resin, and the reactive resin components are an isocyanate component and an isocyanate-reactive component comprising a polyol and a hydroxy-terminated acrylate monomer or hydroxy-terminated (meth)acrylate monomer.

The process according to the invention is in particular used for the production of rotor blades for wind turbines.

The construction of the cavity in particular provides the following: a) a frame profile which delimits an interior space and which is intended to delimit the shape of the composite component to be produced in the interior space of the cavity, b) an input duct for the evacuation of the interior space and for the input of resin into the interior space of the frame profile, where the input duct has an input aperture communicating with the interior space of the frame profile, c) one or more drying ducts for the introduction of a drying gas to remove moisture from the composite component to be produced and for the application of vacuum during the vacuum-infusion procedure, where each drying duct has an introduction aperture communicating with the interior space of the frame profile, d) a vacuum foil enclosing, in gastight manner, the frame profile, the input aperture of the input duct and the introduction aperture of the drying duct(s), and, arranged between the vacuum foil and the frame profile, a gas-permeable separator membrane for the retention of resin in the interior space of the frame profile, where the aperture of the drying duct(s) is/are arranged between the vacuum foil and the separator membrane, and the separator membrane encloses the frame profile. It is also possible to use, instead of a separator membrane, a suitable nonwoven material or another textile which exhibits a resin flow barrier.

When the drying gas flows through the infusion device from the introduction point, it must first pass through the separator membrane before it can absorb and remove moisture, in particular water present in fibers, in the interior space of the frame profile. The separator membrane here provides significant resistance to flow of the drying gas. Because, in relation to the interior space of the frame profile, the introduction aperture for the drying gas is outside of the separator membrane and the suction-removal aperture is within the separator membrane, the drying gas is required to overcome the flow resistance provided by the separator membrane only once. It is thus also possible to avoid back mixing of drying gas that has already absorbed moisture with drying gas that is very recently input, and is dry. Studies have shown that in comparison with an opposite flow direction for the drying gas, i.e. from the suction-removal aperture to the introduction aperture, the pressure in the interior space of the frame profile, and also in the interior of the composite component to be produced, can be reduced. This facilitates evaporation of water, and therefore drying can take place more rapidly and more effectively. A greater degree of drying of the interior of the frame profile can be achieved at comparable temperatures, with comparable drying time and with comparable mass flow rate of the drying gas. Because the proportion by mass of water in the interior of the frame profile is relatively small, this being by way of example water introduced by way of the fibers that are arranged in the interior of the frame profile and that form part of the fiber-reinforced composite component that is to be produced, reactions between water remaining in the infusion device and the input resin, during which gaseous reaction products such as carbon dioxide can be the cause of vacuoles in the composite component, are avoided, or at least their extent is reduced.

In particular when a vacuum and/or a reduced pressure is applied to the suction-removal aperture, this very low pressure can be applied to the interior space of the frame profile by way of a minimal flow resistance. If, with an opposite flow direction for the drying gas, this very low pressure were to have been applied at the introduction aperture, this very low pressure would be applied at the separator membrane, and therefore, by virtue of the flow resistance resulting from the separator membrane, a correspondingly higher pressure would prevail in the interior space of the frame profile. Because the drying gas is input outside of the separator membrane and removed by suction within the separator membrane, a particularly low pressure promoting evaporation of water can be achieved in the interior space of the frame profile, and the risk of vacuoles in the fiber-reinforced composite components can therefore be small.

The degassing and drying in step c. takes place with the aid of a vacuum source attached by way of an outlet to the input duct for the resin. The degassing and drying can optionally take place with additional introduction of drying gas by way of the drying duct, or with additional application of vacuum by way of the drying duct by means of a vacuum source.

The outlet by way of which the vacuum for the drying is applied to the input duct for the resin is preferably a stop valve.

A reduced pressure, in particular a vacuum pressure, is applied in the interior space of the cavity by way of the input duct, by way of the vacuum source attached on the input line. The vacuum pressure is in particular <20 mbar, particularly preferably <10 mbar. This can provide a particularly low pressure in the interior space of the frame profile, thus promoting the evaporation of water.

The first vacuum source, which is attached to the drying duct, and the second vacuum source, which is attached to the outlet, can be identical; this means that the same vacuum pump is attached at the drying duct and at the outlet. In another embodiment, the first and the second vacuum source can be different.

The drying is thus more efficient, because the resistances to flow permit more rapid achievement of a higher vacuum in the component. If, as is normally the convention, the vacuum is applied only through the membrane on the vacuum side, much more time is required to achieve a high vacuum. The reason for this difference is the following. Alongside the gas volume that is present in the component at ambient pressure, suction is additionally required for removal, from the component, of the water vapor arising. This volume arises over the entire drying period, and in the case of drying by way of the membrane provides a higher residual pressure in the component. Here it is recognized that it is advantageous to delay input of the resin until drying via evacuation, optionally with the aid of a drying gas, has been concluded. Another advantage of this construction of the device is that the input line, and optionally also the metering and mixing units, is/are likewise degassed and dried by way of the vacuum source attached laterally by a stop valve on the input duct.

The vacuum-assisted infusion of the reactive resin mixture therefore preferably directly follows the drying and evacuation of the mold comprising the fibers/the laid fiber scrim, and also of the input line, by means of vacuum.

The reaction-injection device can in particular be configured as in the embodiments described in WO 2012/123280. According to the invention, the feeds, i.e. reactive resin components, are degassed before mixing and/or in-line by way of a separate vacuum source, and are metered by way of metering units, e.g. metering pumps, into the mixing unit, e.g. a static mixer. An important difference from the construction revealed in WO 2012/123280 is that the input line that follows the mixing unit has connection laterally by way of a stop valve to a vacuum source which is utilized to dry the cavity with the laid fiber scrim, the input duct, and the input line itself, before the start of the infusion procedure.

The infusion procedure is started by start-up of the metering units for the resin components after degassing of the feeds and drying of the structure and of the lines have been concluded. The resin components are metered into the mixing unit, and are mixed therein. The vacuum source attached laterally on the input line must be isolated before the resin mixture reaches the stop valve; by way of example, it can be isolated by way of the stop valve before start-up of the metering units. In a preferred embodiment, isolation of the stop valve is delayed until the resin mixture in the input line has already almost reached the valve. The stop valve in the input line is particularly advantageously arranged as close as possible to the duct for input into the cavity, so that isolation of the stop valve can be delayed until shortly prior to entry of the resin mixture into the cavity. The input line can be a rigid line or a flexible tube, preferably a flexible tube. The vacuum source is then, for example, attached by way of a T-piece with stop valve.

The metering of the resin mixture takes place in a controlled manner. For this, the absolute pressure at the entry point of the component (at the input duct) is measured. The quantity selected at the beginning of the injection procedure can by way of example be the maximal achievable quantity that can be metered by the metering pumps. A typical value for charging material for a large component, e.g. a wind turbine blade, is 20 kg/min; however, for particularly large components this value can also be 40 kg/min or even higher.

In a preferred embodiment, when a preselected maximal entry pressure at the component, measured at the input duct, has been reached, the reaction-injection device applies control to reduce the output quantity emerging from the mixing unit, thus preventing any possible lifting of the vacuum foil. For this purpose, the preselected maximal entry pressure at the cavity must be below the ambient pressure, e.g. 0.01 bar-0.2 bar below the ambient pressure, preferably between 0.88 and 0.92 bar absolute. The magnitude of the pressure difference to be established also depends on the point at which the input duct is attached to the cavity. If the cavity extends below the point at which the input duct is attached, this height difference must be taken into account, because the geodetic pressure of the liquid resin is additional to the ambient pressure and therefore reduces the permissible maximal fill pressure; this means that the pressure difference to be established is greater, in certain circumstances even >0.2 bar.

It is preferable that the reaction-injection device applies control to reduce the output quantity in continuously variable fashion and in precise agreement with the formulation, so that the entry pressure at the cavity is kept constant at the maximal entry pressure. It is possible here that with increasing charge level the output quantity approaches zero, while the entry pressure at the component is maintained.

In another embodiment of the process, the input line (45) additionally has a buffer container (51). The buffer container (51) can by way of example be a tank or else an elastic bladder amenable to disposal after production of the composite component. The volume of the buffer container is by way of example 40-300 l. It is important that said container is likewise dried and degassed by way of the vacuum source (50 or 47) before the infusion procedure starts. This embodiment has the advantage that it is also possible to utilize a reaction-injection device whose output quantity cannot be controlled across such a wide range. In this case, the entry pressure at the cavity controls the quantity output from the buffer container.

Other aspects of the infusion device, consisting of reaction-injection device, input line and cavity, and/or of a process for the production of fiber-reinforced composite components, in particular with the aid of such an infusion device, can be configured and further developed as described in EP 2 886 322 A1, the content of which is hereby incorporated as part of the invention. Drying gas used can by way of example be an inert gas, in particular $N_2$, which can by way of example be input with a volume flow rate that is greater than or equal to 5 standard l/min±0.5 standard l/min. A pressure p defined by way of example by 20 mbar≤p≤100 mbar, in particular 35 mbar≤p≤80 mbar and preferably defined by 45 mbar≤p≤60 mbar can be established in the interior space of the frame profile. A pressure loss Δp for the drying gas between the introduction aperture and the interior space of the frame profile can by way of example be defined by 100 mbar≤Δp≤900 mbar, in particular 250 mbar≤Δp≤600 mbar and preferably 350 mbar≤Δp≤450 mbar. The temperature T in the interior space of the frame profile during the drying of the fibers can, on average over the drying time, in particular be defined by 20° C.≤T≤90° C., preferably 25° C.≤T≤70° C., with more preference 30° C.≤T≤50° C. and with particular preference T=35° C.±3K. With such parameters, a drying time t, during which the drying gas is input, defined by 30 min≤t≤240 min, in particular 60 min≤t≤180 min and preferably by 90 min≤t≤120 min, is already sufficient to achieve drying of the fibers to such an extent that in essence no water remains that could react with the resin. It is preferable that the temperature and/or the pressure and/or the volume flow rate is/are in essence constant over the drying time, but it is also in principle possible here, during the drying time, to apply a chronologically varying temperature profile and/or a chronologically varying pressure profile and/or a chronologically varying volume flow rate profile of the drying gas. The resin can in particular consist predominantly or completely of PUR. The frame profile, in particular amenable to assembly from a plurality of profile parts, can by way of example have been produced from a steel, from composites or from polymer foams. The frame profile preferably has thermal coupling to a heat source, for example heating equipment, in order to establish, in the interior space of the frame profile, a defined temperature, which is optionally controlled.

In particular, arranged between the vacuum foil and the separator membrane there is a gas-spacing layer for the distribution of the drying gas over the interior space of the frame profile; in particular here, the introduction aperture for the drying gas is arranged between the vacuum foil and the gas-spacing layer. The thickness of material of the gas-spacing layer, also termed "breather", and the permeability of the gas-spacing layer to the drying gas, can be sufficient to permit easy distribution of the drying gas within the gas-spacing layer. The drying gas can therefore become distributed in essence over the entire separator-membrane surface covering the interior space of the frame profile. The drying gas can therefore, while it is still dry, enter over a correspondingly large area through the separator membrane into the interior space, and extract water and/or water vapor. The gas-spacing layer can contribute to the resistance to flow for the drying gas, but the flow resistance of the gas-spacing layer can be significantly lower than the flow resistance of the separator membrane. The gas-spacing layer can by way of example be configured via a nonwoven material and/or any other sufficiently porous entity.

It is particularly preferable that the frame profile has an entry profile, at whose side the input aperture of the input duct is arranged, and, opposite to the entry profile, an opposite profile, at whose side the introduction aperture of the drying duct is arranged. When the drying gas is input at the opposite profile by way of the introduction aperture and is removed by suction by way of the input duct, the drying gas must flow over the entire width from the opposite profile to the entry profile, and therefore during the residence time of the drying gas in the interior space of the frame profile a particularly high loading of the drying gas with water can take place. It is preferable that the input aperture and the introduction aperture are arranged at frame-profile regions at which the dimensions of the interior space approach a maximum.

It is preferable that the input aperture of the input duct and/or the introduction aperture of the drying duct is/are arranged at a frame-profile side that faces away from the interior space of the frame profile. The drying gas and/or the resin can flow from the external side of the frame profile, for example by way of an open-top aperture of the frame profile, into the interior of the frame profile. It is thus possible to avoid impairment of the shape of the required composite component by an input duct and/or drying duct protruding into the interior of the frame profile. The infusion device can moreover easily be modified for different three-dimensional designs of the required composite component by changeover of the frame profile.

It is particularly preferable that, in order to distribute the resin along the interior space of the frame profile, a resin-spacing layer is provided that to some extent delimits the interior space of the frame profile, in particular in essence in the shape of an L, where in particular the resin-spacing layer has an open shape toward the introduction aperture of the drying duct and/or toward the opposite profile. The thickness of material of the resin-spacing layer and the permeability of the resin-spacing layer to the resin can be sufficient to permit easy distribution of the resin within the resin-spacing layer. In particular, the resin can flow laterally by way of the resin-spacing layer at the periphery of the interior space of the frame profile into a basal region where the resin can in essence become uniformly distributed across the entire base of the interior space. The following resin can then gradually flow from below from the resin-spacing layer upward into the interior space and fill the interior space until the resin is retained in the interior space by the separator membrane. Air remaining in the interior space can easily be displaced by the rising liquid surface of the resin and forced through the separator membrane. Because the resin is required only to flow by way of one side region into the basal region of the interior space, there is no requirement to provide the resin-spacing layer at the opposite side in the region of the opposite profile, and therefore the drying gas does not have to flow through the resin-spacing layer into the interior space of the frame profile. An unnecessary resistance to flow of the drying gas is thus avoided, and use of material for the resin-spacing layer is kept small. The resin-spacing layer can by way of example be configured via a nonwoven material and/or any other sufficiently porous entity.

In particular, in order to exchange resin along the interior space of the frame profile, a perforated foil is provided that to some extent delimits the interior space of the frame profile, in particular in essence in the shape of a U, where in particular the perforated foil has an open shape toward the introduction aperture of the drying duct and/or toward the opposite profile. The perforated foil can in particular be arranged at that side of the resin-spacing layer that faces toward the interior space. The perforated foil can on the one hand permit passage of the resin into the interior space, and also exit of excess resin from the interior space, but on the other hand can also provide a resistance to flow of the resin sufficient to allow maximal uniformity of distribution of the input resin at that side of the perforated foil that faces away from the interior space. Because the resin is required only to flow by way of one side region into the base region of the interior space, there is no requirement to provide the perforated foil at the opposite side in the region of the opposite profile, and therefore the drying gas does not have to flow through the perforated foil into the interior space of the frame profile. An unnecessary resistance to flow of the drying gas is thus avoided, and use of material for the perforated foil is kept small.

For the support of the frame profile there is preferably a basal part provided, in particular in the form of a sheet, where in particular the frame profile and/or vacuum foil has/have direct or indirect connection to the basal part. The basal part can dissipate gravitational forces arising and, with the vacuum foil and/or the separator membrane, can be capable of providing adequate integrity.

It is particularly preferable that a peel ply is provided in the interior space of the frame profile for the wrapping of the required composite component, where the peel ply provides flow resistance that allows flow of resin, where the flow resistance of the peel ply is in particular greater than the flow resistance of the resin-spacing layer and/or greater than the flow resistance of the perforated foil. In particular, the peel ply is produced from an in particular woven and/or laid and/or knitted polyamide or polyester.

The invention moreover provides an infusion device comprising a. reaction-injection device (40) comprising at least two feeds (48, 49) comprising the reactive resin components, evacuation equipment (50) for the degassing of the feeds (48, 49), a metering unit (44a, 44b) attached respectively to the feeds (48, 49) by way of supply lines (41, 42), and a mixing unit (43) in which the reactive resin components from the metering units (44a, 44b) are brought together, and b. a closed cavity (10) comprising a laid fiber scrim (21), which
  i. is encompassed by a shell that has at least one input duct (31) suitable for the application of vacuum to the cavity (10) and for the input of resin into the cavity (10), and
  ii. has at least one drying duct (32) suitable for the introduction of a drying gas into the cavity in order to remove moisture from the laid fiber scrim (21) and for the application of vacuum by means of a first vacuum source (34) for the evacuation during the infusion and optionally during the drying, and
  iii. has connection to the reaction-injection device (40) at the input duct (31) by way of an input line (45), where this input line (45) can be evacuated by way of a lateral outlet (46) which can be closed and which is attached on a second vacuum source (47).

In one embodiment, the first and second vacuum source can be identical; this means that the same vacuum pump is attached at the drying duct (32) and at the outlet (46).

The configuration of, and further development of, the process can in particular be as explained above with reference to the infusion device.

By virtue of the process, optionally including a drying gas which is input outside of the separator membrane and removed by suction within the separator membrane, it is possible to achieve, in the interior space of the frame profile, a particularly low pressure that promotes the evaporation of water, and additionally to bring about, in the interior space of the frame profile, in particular via the exchange of the drying gas, a low humidity (and/or gas moisture content), with resultant low risk of vacuoles in fiber-reinforced composite components.

The invention is illustrated below by way of example on the basis of a preferred working example of the infusion device, with reference to the two drawings attached; an aspect of the invention can be represented either by any of the individual features set out below or else by said features in combination.

Figure 2:
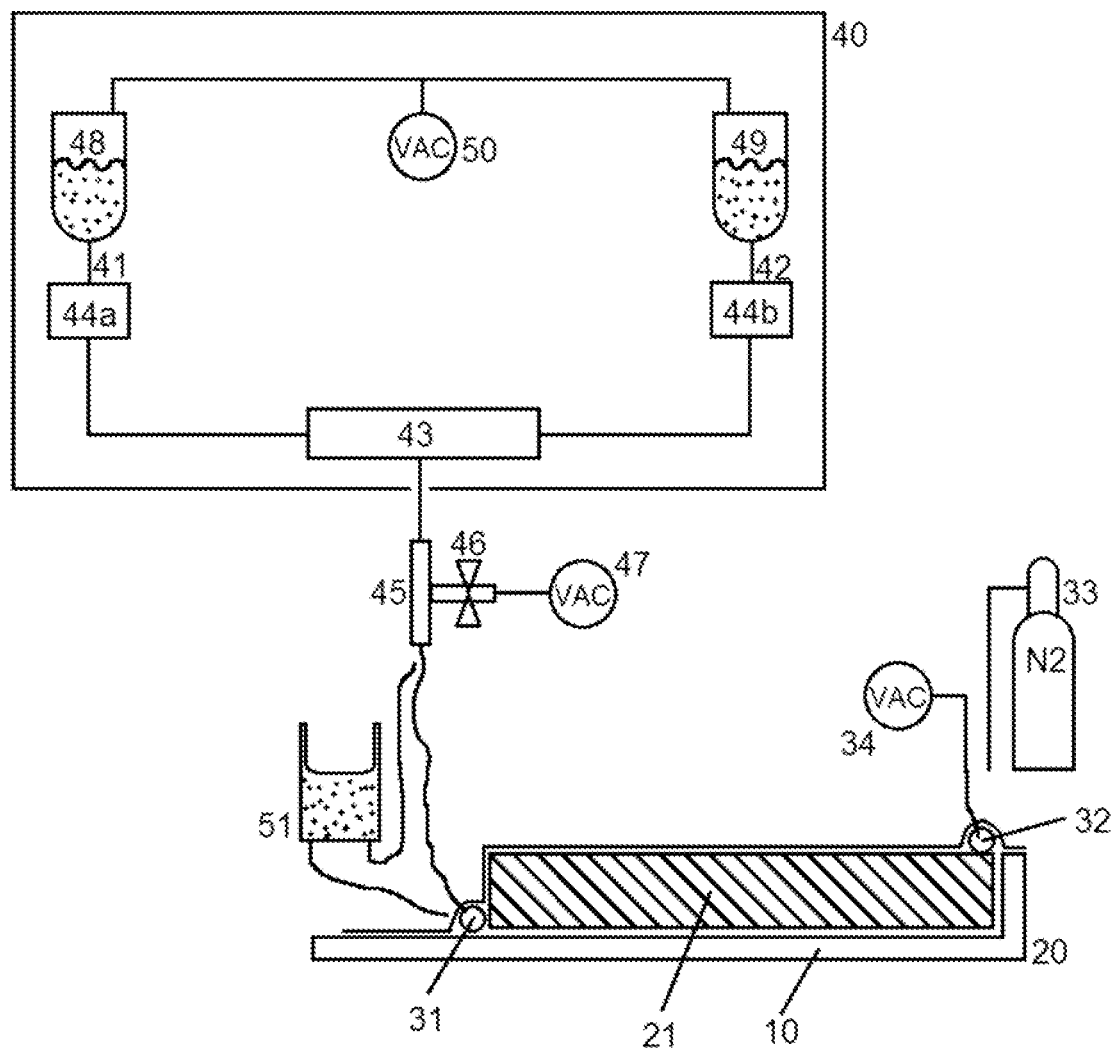
FIG. 2 depicts an infusion device with a buffer container.

FIG. 1 Infusion device
Reaction-injection device 40
Feeds for the resin components 48, 49
Evacuation equipment 50 for the feeds
Supply lines 41, 42
Metering units 44a, 44b
Mixing unit 43
Cavity 10
Fiber-reinforced composite component 20
Laid fiber scrim 21
Input duct 31
Drying duct 32
Drying gas 33
First vacuum source 34
Input line 45
Outlet 46
Second vacuum source 47
FIG. 2 Infusion device with buffer container
Reaction-injection device 40
Feeds for the resin components 48, 49
Evacuation equipment 50 for the feeds
Supply lines 41, 42
Metering units 44a, 44b
Mixing unit 43
Cavity 10
Fiber-reinforced composite component 20
Laid fiber scrim 21
Input duct 31
Drying duct 32
Drying gas 33
First vacuum source 34
Input line 45
Outlet 46
Second vacuum source 47
Buffer container 51

The infusion device and the process according to the invention can advantageously be utilized for the production of large composite components, e.g. for the production of rotor blades for wind turbines made of resins based on polyurethane polymers, on hybrid polymers, on unsaturated polyester polymers, on vinyl ester polymers and/or on epoxy polymers.

In a preferred embodiment, the resin used in the process according to the invention is a polyurethane-polyacrylic hybrid resin, and the reactive resin components are an isocyanate component and an isocyanate-reactive component comprising a polyol and a hydroxy-terminated acrylate monomer or hydroxy-terminated (meth)acrylate monomer.

What is claimed is:

1. A vacuum-assisted infusion process for the production of fiber-reinforced composite components, wherein a reactive resin mixture is injected into a closed cavity comprising a laid fiber scrim, comprising the steps of:
a. providing a reaction-injection device comprising at least two feeds comprising reactive resin components, evacuation equipment for degassing of the feeds, a metering unit attached respectively to the feeds by way of supply lines, and a mixing unit in which the reactive resin components from the metering units are brought together, and
b. providing the closed cavity comprising the laid fiber scrim, which
  i. is encompassed by a shell that has at least one input duct suitable for applying a vacuum to the cavity and for introducing the reactive resin mixture into the cavity, and
  ii. has at least one drying duct suitable for introducing a drying gas into the cavity in order to remove moisture from the laid fiber scrim and for applying a vacuum using a first vacuum source for evacuation during infusion and optionally during drying, and
  iii. has connection to the reaction-injection device at the input duct by way of an input line, where the input line is evacuatable by way of a lateral outlet which is closeable and which is attached to a second vacuum source,
c. degassing and drying of the cavity and of the laid fiber scrim present therein, of the input line and optionally of the metering unit and/or mixing unit with the aid of the second vacuum source, where optionally a drying gas is introduced by way of the drying duct or optionally an additional evacuation takes place with the aid of the first vacuum source, d. start of an infusion procedure via introducing the reactive components from the feeds into the metering units of the reaction-injection device by way of the supply lines, and producing a reactive resin mixture from the components in the mixing unit, where the outlet to the second vacuum source is closed before said outlet is reached by the reactive resin mixture, and e. injecting the reactive resin mixture by way of the input duct into the cavity with simultaneous evacuation of the cavity with the aid of the first vacuum source by way of the drying duct, where, during the injection, an entry pressure measured at an entry point of the cavity remains lower than ambient pressure, and f. completing reaction of the resin mixture with hardening in the cavity.

2. The vacuum-assisted infusion process for the production of fiber-reinforced composite components as claimed in claim 1, wherein the process is a vacuum-assisted resin transfer molding process.

3. The process as claimed in claim 1, wherein, when a specified maximal entry pressure, measured at the entry point of the cavity, is reached, the metering unit applies control to reduce an output quantity in continuously variable fashion, whilst ensuring compliance with a maximal entry pressure.

4. The process as claimed in claim 3, wherein the maximal entry pressure, measured at the entry point of the cavity, is 0.01 bar-0.2 bar below the ambient pressure.

5. The process as claimed in claim 3, wherein the maximal entry pressure is between 0.88 and 0.92 bar absolute.

6. The process as claimed in claim 1, wherein the input line additionally has a buffer container.

7. The process as claimed in claim 6, where the buffer container is an elastic bladder.

8. The process as claimed in claim 1, wherein the fiber-reinforced composite component is a wind turbine rotor blade and the resin comprises polyurethane resins, unsaturated polyester resins, vinyl ester resins, hybrid resins, epoxy resins, or a combination thereof.

9. The process as claimed in claim 1, wherein the resin is a polyurethane-polyacrylic hybrid resin and the reactive resin components are an isocyanate component and an isocyanate-reactive component comprising a polyol and a hydroxy-terminated (meth)acrylate monomer.

10. The use of the process as claimed in claim 1 for the production of rotor blades for wind turbines.

\* \* \* \* \*